United States Patent [19]

Laesser

[11] 4,154,120

[45] May 15, 1979

[54] MECHANISM FOR DRIVING, STEP-BY-STEP, A ROTATABLE MEMBER

[75] Inventor: Claude Laesser, La Chaux-de-Fonds, Switzerland

[73] Assignee: Ebauches S.A., Neuchatel, Switzerland

[21] Appl. No.: 550,967

[22] Filed: Feb. 19, 1975

[30] Foreign Application Priority Data

Feb. 22, 1974 [CH] Switzerland .................... 2500/74

[51] Int. Cl.$^2$ .............................................. F16H 25/08
[52] U.S. Cl. ................................................. 74/55
[58] Field of Search .................... 74/53, 54, 55, 56, 57

[56] References Cited

U.S. PATENT DOCUMENTS

| 1,748,443 | 2/1930 | Dawson | 74/55 |
| 1,979,195 | 10/1934 | Govare et al. | 74/55 |
| 3,142,131 | 7/1964 | Rabenau | 74/55 |

Primary Examiner—Samuel Scott
Assistant Examiner—Wesley S. Ratliff, Jr.

Attorney, Agent, or Firm—Silverman, Cass & Singer, Ltd.

[57] ABSTRACT

A rotatable member to be driven step-by-step having a set of grooves, each of the grooves having two circular portions offset from one another and joined by a connecting portion. A driving rotatable disc has a first protrusion, having a radius of trajectory equal to the radius of the circular portions, which engages the first circular portion without driving the rotatable member. The protrusion follows the first circular portion as it rotates until it reaches the connecting portion where it drives the rotatable member forward one step until the protrusion is aligned with the second circular portion. The protrusion then follows the second circular portion without moving the rotatable member. A second protrusion can be provided on the driving rotatable disc to follow a third circular portion of a different radius so the rotatable member is locked in position except when the first protrusion is in the connecting portion. Alternately, a fourth circular portion of equal radius to the first and second circular portions can be provided connecting the second circular portion with the first circular portion of the next groove.

4 Claims, 7 Drawing Figures

MECHANISM FOR DRIVING, STEP-BY-STEP, A ROTATABLE MEMBER

The present invention relates to a mechanism for driving, step by step, a rotatable member by means of a driving rotatable element provided with at least one protrusion cooperating with a recess of the driven member.

This mechanism will be used, preferably, but not exclusively, for the control of the step by step advance of an indicator of timepiece such as, for instance, a date-indicator.

The mechanism according to the invention is characterized by the fact that the recess of the driven member is constituted by a set of grooves each showing two circular portions, connected together by a connection portion, the radius of the circular portions corresponding to the radius of the circular trajectory followed by the protrusion of the driving element, these circular portions being arranged in such a way that their centers come, during the displacements of the driven member, successively to coincide with the center of rotation of the driving element, the center of the second circular portion of each groove coinciding moreover with the center of the first circular portion of the next groove, the whole in such a way that, for each step of advance of the driven member, the protrusion of the driving element follows the first circular portion of one of the said grooves, which circular portion has then its center coinciding with this one of the driving element, so that the said protrusion locks then the driven member, then follows the connection portion of the said groove, in a movement producing the advance of one step of the driven member, that brings this latter into a position in which the second portion of the said groove, as well as the first portion of the next groove, have their common center which coincides with the center of rotation of the driving element, the protrusion of this latter following then the second circular portion of the said groove, thus locking anew the driven member, before engaging into the first portion of the next groove, in view of the repetition of the cycle.

The drawing shows, by way of example, two embodiments of the object of the invention.

Figure 1:
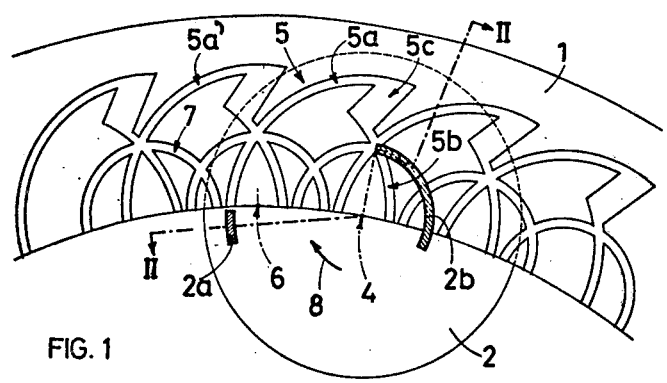
FIG. 1 is a plane view of a driving mechanism of a date-indicator of a timepiece.
Figure 2:
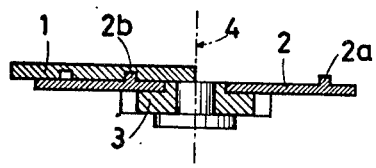
FIG. 2 is a sectional view along line II—II of FIG. 1.
Figure 3:
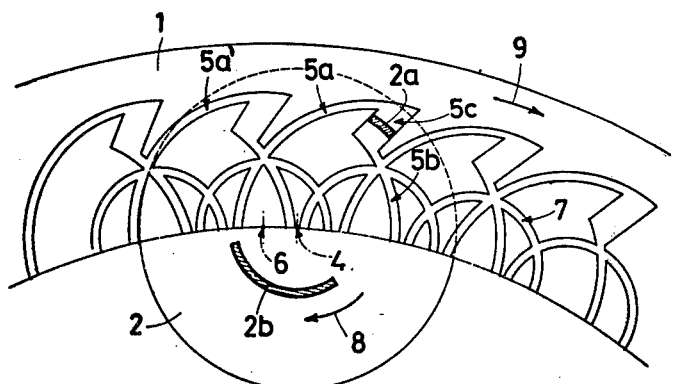
FIGS. 3 and 4 are plane views of the mechanism of FIG. 1 in two different operating positions.

In the first embodiment, the date-indicator carrying the indications 1 to 31, not represented, is constituted by a crown 1. This crown is driven, step by step, at the rate of one step per 24 hours, by a driving plate 2, making one revolution per 24 hours, rigid with a wheel 3 meshing with the gearing of the movement, not represented, which drives it. The geometric center of rotation of the driving disc 2 has been designated by 4 on each of the FIGS. 1 through 4.

The disc 2 is provided with two protrusions one of which, designated by 2a, serves to the driving and to the locking of the date-indicating crown 1, and the other of which, designated by 2b, serves exclusively to the locking of this crown.

The crown 1 is provided, on its lower face, with a first set of grooves 5 comprising each a first circular portion 5a, a second circular portion 5b and a connecting portion 5c connecting the two portions 5a and 5b to each other. It is to be noted that the several grooves have been represented in the drawing in full lines, for increasing the clearness of the drawing, while, the crown 1 being seen from above, the grooves should normally have to be represented in dotted lines.

The radius of the circular portions 5a and 5b of each of the grooves 5 is the same as the radius of the circular trajectory followed by the protrusion 2a of the disc 2. Moreover, these circular portions are arranged on the crown 1 in such a way that, during the displacements of this crown, their centers come successively to coincide with the center 4 of rotation of the disc 2. At last, the center of each second portion 5b of a groove 5 of the set, one of which has been represented at 6 in FIG. 1, coincides with the center of the first portion 5a of the next groove, the one the center of which has been indicated at 6 having been designated by 5a'.

The date-indicating crown 1 is provided with a second set of grooves 7, each having the shape of half a circle, the centers of which coincide with the successive centers 6 of the circular portions of the grooves 5 and the radius of which corresponds to the radius of the circular trajectory of the protrusion 2b of the disc 2.

The operation of the mechanism as disclosed and represented is the following:

The disc 2 rotating in the direction of the arrow 8 of FIG. 1, the protrusion 2a of this disc engages into the first portion of one of the grooves 5, for instance the portion designated by 5a in FIG. 1, and follows this portion, thus ensuring the locking of the crown 1. This protrusion 2a then engages the portion 5c (FIG. 3) that if follows while producing then the advance of one step of the crown 1 in the direction of the arrow 9 of FIG. 3.

This displacement brings the crown 1 into a position in which the common center of the second portion 5b of the groove 5 with which cooperates the protrusion 2a and of the first portion 5a" of the next groove coincides with the center of rotation 4 of the disc 2.

Figure 4:
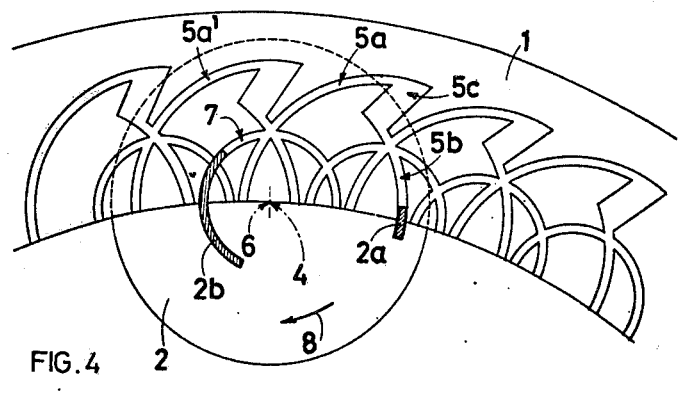

The protrusion 2a then follows the second portion 5b of the groove 5 with which it is cooperating, that locks the crown 1. As shown by FIG. 4, before the protrusion 2a has left the portion 5b of the groove 5, the protrusion 2b of the disc 2 has already engaged one of the grooves 7 of the second set, ensuring thus the locking of the crown 1. It will not leave it before the protrusion 2a has engaged the portion 5a'. Thus, the crown is permanently locked, either by the protrusion 2a or by the protrusion 2b, between each of its step by step displacements.

It is to be noted that neither the advance of the crown 1 nor its locking use so much energy as in the conventional jumping mechanisms where the jumper must be displaced, against the action of its return spring, at each advance of the date-indicator. This small consumption of energy is specially precious in the case of electric watches in which one has only a very limited reserve of energy.

It is also to be noted that the control disc 2 can be submitted to the action of a control mechanism having instantaneous advance, known per se, arranged in such a way as to produce the jump of this disc 2 at the moment where its protrusion 2a attacks the connecting portion 5c of each of the grooves 5, that will then produce a rapid displacement of the date-indicating crown 1.

Figure 5:
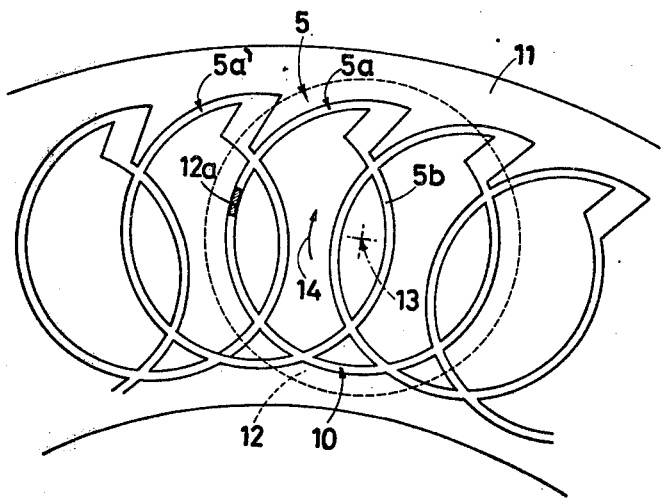
FIGS. 5, 6 and 7 are plane views of a second embodiment of a control mechanism of the date-indicator of a timepiece, represented in three different working positions.
Figure 6:
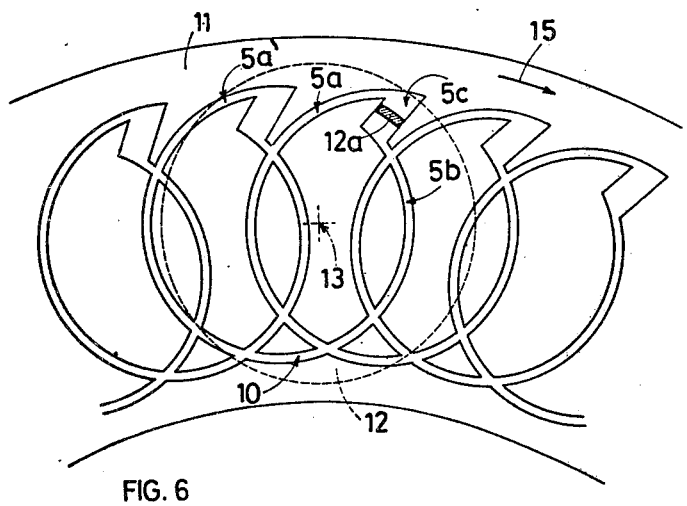
Figure 7:
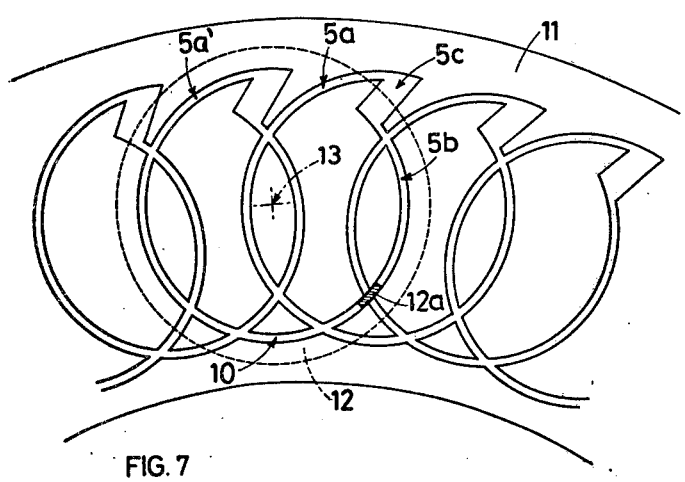

The embodiment of FIGS. 5 to 7 distinguishes from the first embodiment by the fact that the semicircular grooves, designated by 10, of the second set, provided in the date-indicating crown, designated by 11, have the same diameter as the circular portions 5a and 5b of the grooves 5 of the first set. As it was the case of the grooves 7 of the first embodiment, the grooves 10 of the second set have their centers which coincide with the common centers of the second portion 5b of each groove 5 and of the first portion 5a of the next groove.

In this embodiment, the control disc, designated by 12, having its center at 13, is provided with only one protrusion 12a operating as the two protrusions 2a and 2b of the disc 2 of the first embodiment.

The disc 12 rotating in the direction of the arrow 14 (FIG. 5), the protrusion 12a first follows the first portion 5a of the one of the grooves 5, then locking the crown 11, then engages the connecting portion 5c of the groove 5 (FIG. 6), thus driving of one step the crown 11 in the direction of the arrow 15 and, after having followed the portion 5b of the groove 5, locking the crown 11, engages this one of the grooves 10 of the second set the center of which coincides with the center of the portion 5b it has just followed, follows this groove 10 while locking the crown 11 (FIG. 7) for repeating the cycle while engaging the first circular portion of the next groove, designated by 5a' in FIG. 7.

What I claim is:

1. A step-by-step driving mechanism comprising:
    a rotatable member having a center of rotation and a recess having a first set of grooves, said first set of grooves having at least a first and second groove;
    each of said grooves comprising a first circular portion having a first center and a first radius, and a second circular portion having a second center and a second radius, said second center offset from said first center, said first and second radius being equal, said first and second centers positioned on a circular trajectory having a center coinciding with said center of rotation;
    said first and second circular portions connected by a connecting portion, said second circular portion of said first groove having a common center with said first circular portion of said second groove;
    a driving rotatable element overlapping said rotatable member having a center of rotation positioned on said circular trajectory; and
    protrusion means extending from said driving rotatable element having a radius equal to the radius of said first and second circular portions, for engaging said recess as said driving rotatable element rotates, for following said first circular portion of said first groove without moving said rotatable member from a first position, passing into and engaging said connecting portion to drive said rotatable member to a second position, and passing into and following said second circular portion of said first groove without moving said rotatable member, then leaving the second circular portion of said first groove, and then passing into and following said first circular portion of said second groove without moving said rotatable member.

2. A mechanism as claimed in claim 1 wherein said recess further includes:
    a second set of grooves, said second set of grooves having at least a third groove;
    said third groove having a third circular portion having a third center and a third radius, said third center coinciding with said common center; and
    said protrusion means following said third circular portion between said second circular portion of said first groove and said first circular portion of said second groove, to lock said rotatable member in said second position.

3. A mechanism as claimed in claim 2 wherein:
    said third radius is not equal to the radius of said first and second circular portions of said first and second grooves; and
    said protrusion means including first means for following said first set of grooves and second means for following said second set of grooves.

4. A mechanism as claimed in claim 2 wherein:
    said third radius is equal to said radius of said first and second circular portions of said first and second grooves; and
    said protrusion means includes a single protrusion for following said first and said second set of grooves.

* * * * *